Aug. 5, 1969    J. A. ROYER    3,459,403
FLUID METERING DEVICE
Filed Feb. 13, 1967
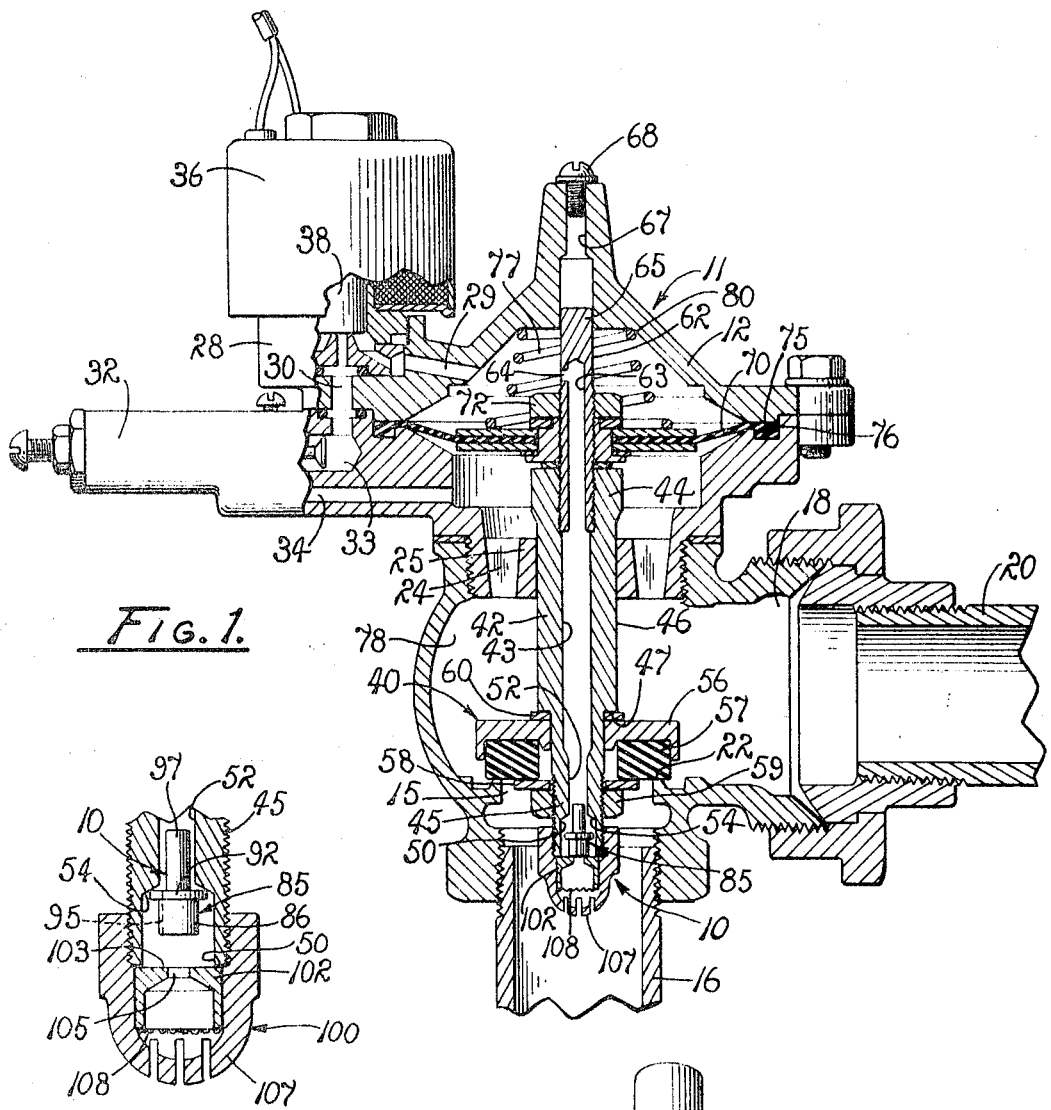
Fig. 1.
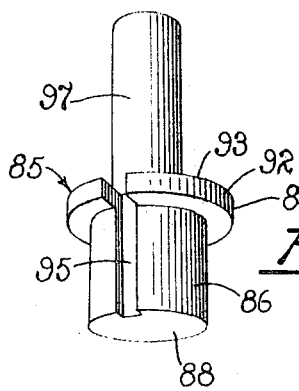
Fig. 2.
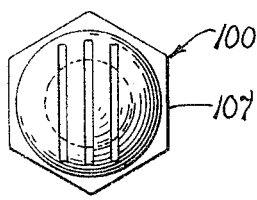
Fig. 3.
Fig. 4.
JOHN A. ROYER
INVENTOR
Huebner & Worrel
ATTORNEYS 3,459,403
FLUID METERING DEVICE
John A. Royer, Fresno, Calif., assignor to Bunkner
Industries, Inc., a corporation of California
Filed Feb. 13, 1967, Ser. No. 615,480
Int. Cl. F16k 31/42; F15b 13/044
U.S. Cl. 251—34                                     4 Claims

ABSTRACT OF THE DISCLOSURE

A fluid metering device adapted to provide a controlled flow of pilot fluid pressure through a control passage in a fluid pressure regulating valve with the passage having an inlet end connected to a source of fluid under pressure and an opposite end subject to volumetric and pressure fluctuations and including a pair of spaced seats within the passage. A slotted plunger is disposed within the passage in reciprocable, free-floating relation between the seats and has opposite ends alternately engageable with respectively adjacent seats to permit a metered flow of fluid pressure therethrough for controlled closing of the valve and alternately to block the return flow of fluid through the passage. The plunger further permits a transfer of fluid in the passage around the plunger during its movement between the seats so as to flush any extraneous matter from the plunger and seats.

Cross-reference to related application

This application constitutes a companion development to my copending application Ser. No. 565,898, entitled "Pressure Regulating Device for Fluid Dispensing Systems," filed July 18, 1966.

Background of the invention

The fluid metering device of the present invention is shown and briefly described in my above designated copending application which, however, is primarily directed to a pressure regulating device for fluid dispensing systems which is adapted automatically to maintain a supply of fluid to the dispensing system at a predetermined constant pressure irrespective of variations within a substantial range in the pressure and volume of fluid discharge by the dispensing system. The fluid metering device of the present invention, being only incidental to the primary objects of my copending application, is not fully described or claimed in that application. Briefly, such pressure regulating device of my copending application relates to a fluid control valve which provides a diaphragm mounting a hollow valve stem with the stem affording communication between a chamber above the diaphragm and a fluid supply conduit for the valve. A valve disc is mounted on the stem and is normally held in a closed position blocking communication between an inlet port and an outlet port for the valve by a spring in the chamber augmenting the force of the fluid pressure in the chamber supplied through the hollow stem. The valve is opened for permitting a flow of fluid between the inlet and outlet ports by controlled discharge of the fluid pressure in the chamber above the diaphragm to relieve the pressure therein and to permit the force of the fluid pressure in the supply conduit to lift the valve disc from the inlet port. In order to close the valve, the discharge of fluid pressure from the chamber above the diaphragm is terminated to permit the fluid pressure therein to equalize with the fluid pressure within the supply conduit. Accordingly, with the fluid pressures on each side of the diaphragm balanced, the force of the spring is sufficient alone to close the valve.

Even though the fluid metering device of the present invention is shown and described hereinafter in connection with a fluid regulating device substantially identical to that covered in my above described copending application, it is not limited to such environment. It will become readily apparent that such metering device may be employed in many varied types of fluid control systems wherein it is desired to meter a flow of fluid pressure between the source of such pressure and a fluid system in which volumetric and pressure fluctuations occur. Conventional metering devices usually employ a body which is disposed in fixed relation within a fluid passage and includes an orifice through which the flow is metered. However, the orifice in such devices is easily clogged with silt, sand, and other extraneous matter usually present in such fluid systems which renders the devices completely inoperable and requires tedious disassembly and cleaning. Furthermore, when specifically adapted to the fluid pressure regulating valve of my prior application, such clogging of the orifice causes the chamber above the valve stem diaphragm to be starved of fluid pressure which results in the valve remaining in an open position and precludes positive closing of the valve. If the orifice were only partially blocked, the lesser amount of fluid pressure directed to the chamber above the diaphragm would not be sufficient positively to close the valve and chattering of the valve on its seat would occur. On the other hand, if no metering device is employed in such valves, and an unrestricted flow of fluid pressure is directed to the chamber above the diaphragm, the pressures above and below the diaphragm would be equalized too quickly and permit slamming of the valve seat to its closed position by the valve closing spring.

Accordingly, it is an object of the present invention to provide an improved fluid metering device for fluid pressure regulating valves and the like.

Another object is to provide such an improved fluid metering device which permits controlled closing of an associated valve without slamming.

Another object is to provide a fluid metering device of the character described which is capable of dependably holding such a valve in a tightly closed position to preclude chattering of the valve with respect to the valve seat.

Another object is to provide a fluid metering device which is substantially self-flushing to minimize or preclude clogging of the metering orifice.

Another object is to provide such an improved fluid metering device which is adapted to be mounted in free-floating, self-centering relation within the fluid passage in which it is mounted.

Other objects and advantages of the present invention will subsequently become more clearly apparent upon reference to the following description and accompanying drawing.

Brief description of the drawing

FIG. 1 is a central cross section through a pressure regulating valve having a fluid metering device embodying the principles of the present invention associated therewith showing the valve and metering device in a static or equalized pressure condition.

FIG. 2 is a somewhat enlarged fragmentary cross section of the metering device and lower end of the valve stem in which the metering device is located.

FIG. 3 is a somewhat enlarged plan view of the lower end of the valve stem in which the metering device of the present invention is mounted.

FIG. 4 is a somewhat enlarged perspective of a plunger utilized in the fluid metering device of the present invention.

Description of the preferred embodiment

Referring more particularly to the drawing, a fluid metering device is generally indicated by the reference numeral 10 and is shown associated with a pressure regulating valve 11. As previously described, the pressure regulating valve is substantially identical to the valve shown and described in my above designated copending application. However, in order clearly to describe the operation of the fluid metering device of the present invention, the regulating valve will be briefly described. The regulating valve includes a housing 12 having an inlet port 15 which screw-threadably receives an elongated supply conduit 16 connected to a source of fluid under pressure, not shown. The housing further includes an outlet port 18 screw-threadably connected to a fluid discharge conduit 20 to provide a flow of fluid to a plurality of discharge outlets such as found in a sprinkler system. An annular valve seat 22 is provided within the housing inwardly adjacent to the inlet port 15.

A plurality of spaced web members 24 support an annular stem guide 25 within the housing in concentric relation to an axis common with the inlet port 15. The housing further provides a substantially circular solenoid supporting boss 28 having a passage 29 communicating with the interior of the housing and a substantially vertical passage 30. An elongated regulator housing 32 is integrally radially outwardly extended from the housing 12 and provides a bore 33 communicating with the passage 30 and a lower auxiliary fluid discharge passage 34 communicating with the interior of the housing in spaced relation to the passage 29. An electrically operated solenoid valve 36 is mounted on the boss 28 and provides a reciprocable plunger 38 which is normally positioned in blocking relation between the passages 29 and 30.

A valve 40 is disposed within the housing 12 in opening and closing relation to the inlet port 15. The valve provides an elongated hollow stem 42 having a passage 43 formed therethrough between an upper internally screw-threaded end 44 and a lower externally screw-threaded end 45. The stem provides an intermediate portion 46 which is slidably disposed through the guide 25 with the lower end being of a somewhat reduced diameter to form an annular shoulder 47. The stem has a counterbore 50 in its lower end 45 in concentric relation with the passage 43. The passage includes a constricted portion 52 axially inwardly adjacent to the counterbore which form therebetween an annular beveled seat 54. A washer constraining disc 56 is received adjacent to the lower end of the stem and mounts an annular seal washer 57 of a suitable compressible material such as composition rubber or the like. The seal washer is held in place by a rigid clamping washer 58 and lock nut 59 in stacked relation with an upper spacer washer 60 against the shoulder 47.

The upper end 44 of the valve stem 42 screw-threadably mounts an elongated extension rod 62 which provides an axial bore 63 terminating short of the upper end of the rod. The bore is extended radially outwardly of the rod by a passage 64. The rod has a substantially solid upper end 65 which is piloted within a bore 67 in the housing 12. A slotted screw 68 is screw-threadably received within a reduced diameter outer portion of the bore 67 to serve as a bleed valve for any fluid which may become trapped within the bore.

A circular diaphragm 70 of resiliently flexible material, such as rubber, plastic, or the like, is mounted on the rod 62 adjacent to the upper end 44 of the stem 42 by a screw-threaded member 72. The diaphragm has an enlarged peripheral sealing edge 75 which is disposed in an annular groove 76 in the housing 12. The diaphragm divides the housing into an upper compartment 77 and a lower compartment 78 adjacent to the inlet port 15. A compression spring 80 is disposed within the upper compartment between the housing and the diaphragm continually to urge the diaphragm stem 42 downwardly with the seal washer 57 pressed tightly in fluid sealing relation against the valve seat 22 of the inlet port 15.

The fluid metering device 10 of the present invention provides a plunger 85 which is disposed within the counterbore 50 of the passage 43 in the valve stem 42. The plunger includes a cylindrical body 86 having a substantially flat lower end 88 and an opposite upper flanged end 89. The upper flanged end has an annular radially outwardly extended flange 92 which provides an upper peripheral edge 93 engageable with the beveled seat 54 of the stem 42, as shown in FIG. 2. An elongated axially extended metering slot 95 is formed in the body 86 and through the flange 92. An elongated pilot rod 97 is axially extended from the upper flanged end 89 of the body and is of a diameter loosely to be received within the constricted portion 52 of the passage 43 in the stem.

The plunger 85 is maintained in free-floating relation within the counterbore 50 by a strainer assembly generally indicated by the reference numeral 100. The strainer assembly includes a hollow screen retaining member 102 having an upper substantially flat surface providing an annular seat 103 for engagement by the lower end 88 of the plunger 85 in blocking relation to an orifice 105 in the retaining member, as best shown in FIG. 1. A slotted crown nut 107 is screw-threadably received on the lower end 45 of the stem 42 in constraining relation to a screen disc 108 and the retaining member 102. Accordingly, the plunger 85 is maintained in free-floating relation within the counterbore between alternate seated positions with the lower end 88 engaging the seat 103 of the retaining member in blocking relation to the orifice 105 as shown in FIG. 1 and a position with the edge 93 of the flange 92 engaging the bevel seat 54 to maintain the metering slot 95 open to the flow of fluid therethrough, as shown in FIG. 2.

Operation

The operation of the described embodiment of the subject invention is believed to be clearly apparent and is briefly summarized at this point. The pressure regulating valve 11 and fluid metering device 10 are shown in FIG. 1 in a closed static condition by virtue of the plunger 38 of the solenoid valve 36 blocking discharge of fluid pressure from the upper compartment 77. In such condition, fluid under pressure in the supply conduit 16 is directed through the slots in the crown nut 107 and the screen disc 108 initially to raise the plunger 85 to its upwardly disposed position with the peripheral edge 93 of the flange engaging the bevel seat 54 of the valve stem 42. The flow of fluid is metered through the slot 95 and outwardly of the passage 43 through the radial passage 64 and into the upper compartment 77. As previously described, since the solenoid valve is closed, the pressure in the upper compartment and the pressure in the supply conduit are equalized so that the diaphragm spring 80 is effective to maintain the valve 40 in its closed position with respect to the inlet port 15. As soon as such balanced condition occurs, the plunger 85 is permitted to gravitate toward the retaining member 102. During such movement, any transfer of fluid between the supply conduit 16 and the upper compartment 77 is permitted to pass around the plunger in flushing relation to the metering slot 95 so as to preclude any accumulation of extraneous mtater and clogging of the slot. Assuming such balanced condition continues, the lower end 88 of the plunger eventually comes to rest in sealing relation upon the seat 103 of the retaining member in blocking relation to the orifice 105.

When it is desired to open the valve 40 to direct a flow of fluid pressure from the suply conduit 16 through the inlet port 15 to the outlet port 18, the solenoid valve 36 is actuated by a supply of electrical energy in the usual manner. Such action lifts the plunger 38 to open communication between the discharge passage 29 from the upper compartment 77 to the vertical passage 30. Such discharged fluid is directed into the bore 33 of the regulator housing 32 for discharge through the auxiliary discharge passage 34 and into the interior of the housing beneath the diaphragm 70. The regulator valve determines the amount of fluid discharged from the upper compartment and is adapted to vary such discharge in response to fluctuations in the volume and pressure of fluid in the outlet port 18 and discharge conduit 20. It will be apparent that during the described controlled discharge of fluid pressure from the upper compartment 77, a pressure differential is established between the supply conduit 16 and the upper compartment. Accordingly, the higher pressure in the supply conduit acting against the lower end of the valve stem 42 forces the stem and seal washer 57 upwardly away from the valve seat 22 in opening relation to the inlet port 15.

During the described balanced condition between the fluid pressure in the supply conduit 16 and the upper compartment 77, the plunger 85 is raised to its upwardly disposed position of FIG. 2 and continues to meter a flow of pilot fluid through the slot 95 and into the upper compartment by way of the passage 43 in the stem 42. When it is desired to close the valve 40, the supply of electrical energy to the solenoid valve is terminated and the plunger 38 is returned in blocking relation to the discharge passage 29. After deactivation of the solenoid valve, the fluid pressure in the upper compartment is gradually increased by the metered flow of fluid through the metering slot 95 of the plunger. As the fluid pressure in the upper compartment and the supply conduit 16 approach the described balanced condition, the spring 80 is effective to begin downward movement of the stem and sealing washer 57 toward the seat 22. Such gradual closing of the valve continues during the controlled increase of pressure in the upper compartment through the metering slot until the fluid pressures are balanced and the seal washer is engaged and tightly held against the valve seat 22 by the spring 80.

Accordingly, such gradual metered increase in the fluid pressure in the upper compartment 77 precludes slamming of the control valve 40 to its closed position. Furthermore, the valve is dependably maintained in its closed position with substantially no opportunity for any chattering of the seal washer 57 against the valve seat 22. It is further noted that when the fluid pressure within the upper compartment and supply conduit 16 are balanced, the plunger again is permitted gravitationally to drift downwardly to the position shown in FIG. 1 with the lower end 88 of the body closing the orifice 105 in the retainer member 102. If a temporary decrease or loss of fluid pressure occurs in the supply conduit, the fluid is retained in the upper compartment under pressure and the valve remains closed until the fluid pressure in the supply conduit is restored.

Although the invention has been herein shown and described in what is conceived to be the most practical and preferred embodiment, it is recognized that departures may be made therefrom within the scope of the invention, which is not to be limted to the details disclosed herein but is to be accorded the full scope of the claims so as to embrace any and all equivalent devices and apparatus.

Having described my invention, what I claim as new and desire to secure by Letters Patent is:

1. A fluid metering device, adapted to be mounted in a fluid passage having an inlet end connected to a source of fluid under pressure and an opposite end and including an orifice at said inlet end, an annular substantially flat flat seat circumscribing the orifice, and an annular beveled seat circumscribing the passage in axially spaced relation to said flat seat, comprising a plunger disposed in free-floating relation within the passage between said flat and said beveled seats, said plunger including a cylindrical body having a substantially flat end engageable with said flat seat in blocking relation to said inlet orifice, and an opposite flanged end peripherally edgewardly engageable with said tapered seat, said plunger including an elongated slot extended axially of the body and through the flanged end to meter a flow of fluid from the source therethrough when said flanged end is engaged with the beveled seat and blocking such flow of fluid when said flat end of the body is engaged with said flat seat to preclude return flow of fluid from said opposite end of the passage toward the source.

2. The fluid metering device of claim 1 in which said plunger is of a somewhat smaller size than the passage to permit free transfer of fluid passed the plunger between said inlet and opposite ends of the passage during movement of the plunger between said fluid blocking and metering positions for flushing the slot of any extraneous material.

3. The improvement of claim 2 in which said plunger includes an elongated cylindrical pilot rod axially extended from said flanged end and being loosely received within the passage in axially sliding self-centering relation.

4. In a pressure regulating device having a housing adapted for connection to a source of fluid under pressure; valve means slidably mounted in fluid flow controlling relation within the housing and being subject to the force of fluid pressure from such a source; pressure sensitive actuating means in the housing controllably connected to said valve means, said valve means being adapted to direct a flow of pilot fluid pressure from the source against said actuating means in a direction opposing the force of fluid from the source against said valve means and in balancing relation; biasing means in the housing engaging said actuating means to impose an additional force against said actuating means in the same direction as that provided by the pilot fluid pressure normally to urge the valve means to a position blocking the flow of fluid from the source through the housing; and pressure relief means adapted selectively to dsicharge said pilot pressure fluid to provide a pressure differential within the housing to permit opening of the valve means by the force of fluid pressure from the source against the valve means and a flow of fluid through the housing; the improvement comprising fluid metering means mounted in said valve means in metering relation to said flow of pilot fluid for controlled return movement of said valve means to said blocking position incident to the termination of said discharge of said pilot fluid by said pressure relief means; said valve means including a passage for directing a flow of pilot fluid pressure from the source therethrough against said actuating means, an annular beveled seat within said passage and an annular substantially flat seat axially spaced therefrom, and said fluid metering means including a plunger reciprocably disposed in blocking relation within the passage and having a slot for metering siad flow of pilot fluid through the passage, said plunger comprising a substantially cylindrical body having a flat end and an opposite flanged end, said plunger being movable in free-floating relation within the passage between a position with said flanged end peripherally edgewardly engaged with said beveled seat when said valve means is open to permit said metered flow of pilot fluid therethrough and a position with said flat end thereof engaged with said flat seat in blocking relation to the flow of pilot fluid through the passage when the valve is closed and during such movement between said engaged positions permitting the transfer of fluid between the source and said actuating means around the plunger in flushing relation to said slot within the plunger.

References Cited

UNITED STATES PATENTS

| | | | |
|---|---|---|---|
| 1,841,456 | 1/1932 | Shand | 251—44 |
| 1,860,974 | 5/1932 | Zinkil | 251—43 X |
| 2,007,652 | 7/1935 | Kocour | 251—34 |
| 2,491,521 | 12/1949 | Samiran | 251—46 X |
| 2,655,172 | 10/1953 | Owens | 251—43 X |
| 2,872,150 | 2/1959 | Phillipe | 251—44 X |
| 3,111,138 | 11/1963 | Humphreys et al. | 137—513.5 X |
| 3,112,094 | 11/1963 | Nees et al. | 251—46 X |
| 3,164,141 | 1/1965 | Jones | 137—513.5 X |

ARNOLD ROSENTHAL, Primary Examiner

U.S. Cl. X.R.

137—513, 533; 251—46